US007350714B2

(12) United States Patent
Wallace et al.

(10) Patent No.: US 7,350,714 B2
(45) Date of Patent: *Apr. 1, 2008

(54) USE OF SMALL ELECTRONIC CIRCUIT CARDS WITH DIFFERENT INTERFACES IN AN ELECTRONIC SYSTEM

(75) Inventors: Robert F. Wallace, Sunnyvale, CA (US); Wesley G. Brewer, Menlo Park, CA (US); Yosi Pinto, Kfar Vradim (IL)

(73) Assignee: SanDisk Corporation, Milpitas, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 11/383,928

(22) Filed: May 17, 2006

(65) Prior Publication Data

US 2006/0202034 A1    Sep. 14, 2006

Related U.S. Application Data

(63) Continuation of application No. 10/886,309, filed on Jul. 6, 2004, which is a continuation of application No. 09/633,089, filed on Aug. 4, 2000, now Pat. No. 6,824,063.

(51) Int. Cl.
*G06K 19/00* (2006.01)
(52) U.S. Cl. ............... 235/487; 235/441; 235/380
(58) Field of Classification Search ............ 235/487, 235/492, 382, 441; 902/2, 26
See application file for complete search history.

(56) References Cited

U.S. PATENT DOCUMENTS

| 4,709,136 | A | 11/1987 | Watanabe |
| 4,734,896 | A | 3/1988 | Soma et al. |
| 4,882,473 | A | 11/1989 | Bergeron et al. |
| 5,093,862 | A | 3/1992 | Scwartz |

(Continued)

FOREIGN PATENT DOCUMENTS

CN    2417505 Y    1/2001

(Continued)

OTHER PUBLICATIONS

European Patent Office, Office Action, mailed in related European Patent Application No. 01 959 385.4 on Jul. 28, 2005, 2 pages.

(Continued)

*Primary Examiner*—Karl D. Frech
(74) *Attorney, Agent, or Firm*—Davis Wright Tremaine LLP

(57) ABSTRACT

Electronic systems, such as automobile radios, portable and other computing devices, and global positioning system receivers, often require that a correct security code be inputted from a small memory card that is removably inserted into a card slot of the system before the system is rendered operable in total or in part, or before certain data can be retrieved. The same type of memory card is also used to store digital data that is utilized by the system in conjunction with its function that is enabled by the security code, such data cards being removably inserted into the same card slot as the card containing the security code. Alternately, both the utilization data and the security code are included on a single card. An example application is an automobile radio wherein data supplied by the second card are of music that is reproduced through the radio's audio system.

6 Claims, 4 Drawing Sheets

U.S. PATENT DOCUMENTS

| | | | |
|---|---|---|---|
| 5,126,548 | A | 6/1992 | Sekiguchi |
| 5,278,395 | A | 1/1994 | Benezet |
| 5,375,084 | A | 12/1994 | Begun et al. |
| 5,434,395 | A | 7/1995 | Storck et al. |
| 5,486,687 | A | 1/1996 | Le Roux |
| 5,625,608 | A | 4/1997 | Grewe et al. |
| 5,694,516 | A | 12/1997 | Grewe et al. |
| 5,696,928 | A | 12/1997 | Grewe et al. |
| 5,724,482 | A | 3/1998 | Grewe et al. |
| 5,742,226 | A | 4/1998 | Szabo et al. |
| 5,773,812 | A | 6/1998 | Kreft |
| 5,847,372 | A | 12/1998 | Kreft |
| 5,852,290 | A | 12/1998 | Chaney |
| 5,877,488 | A | 3/1999 | Klatt et al. |
| 5,887,145 | A | 3/1999 | Harari et al. |
| 5,895,903 | A | 4/1999 | Abe et al. |
| 5,928,347 | A | 7/1999 | Jones |
| 5,933,328 | A | 8/1999 | Wallace et al. |
| 5,936,226 | A | 8/1999 | Aucsmith |
| 6,000,607 | A | 12/1999 | Ohki et al. |
| 6,002,605 | A | 12/1999 | Iwasaki et al. |
| 6,010,066 | A | 1/2000 | Itou et al. |
| 6,040,622 | A | 3/2000 | Wallace |
| 6,073,855 | A | 6/2000 | MacKenthun |
| 6,097,605 | A | 8/2000 | Klatt et al. |
| 6,137,710 | A | 10/2000 | Iwasaki et al. |
| 6,151,647 | A | 11/2000 | Sarat |
| 6,199,128 | B1 | 3/2001 | Sarat |
| 6,216,955 | B1 | 4/2001 | Le Roux et al. |
| 6,226,202 | B1 | 5/2001 | Kikuchi |
| 6,377,160 | B1 | 4/2002 | Groeger |
| 6,460,772 | B1 | 10/2002 | Stahl |
| 6,496,381 | B1 | 12/2002 | Groeger |
| 6,612,498 | B1 | 9/2003 | Lipponen et al. |
| 6,669,487 | B1 | 12/2003 | Nishizawa et al. |
| 6,824,063 | B1 * | 11/2004 | Wallace et al. ............. 235/487 |
| 7,090,124 | B2 | 8/2006 | Wallace et al. |

FOREIGN PATENT DOCUMENTS

| | | | |
|---|---|---|---|
| EP | 0898254 A2 | 2/1999 | |
| EP | 1037159 | 9/2000 | |
| EP | 1 305 717 A2 | 5/2003 | |
| FR | 0329513 B1 | 4/1994 | |
| WO | WO 98/05532 | 2/1998 | |
| WO | WO 98/12825 | 3/1998 | |
| WO | WO 99/09662 | 2/1999 | |
| WO | WO 99/49415 | 9/1999 | |
| WO | WO 00/70553 | 11/2000 | |
| WO | WO 00/70554 | 11/2000 | |
| WO | WO 01/84490 A1 | 8/2001 | |
| WO | WO 02/013021 A2 | 2/2002 | |
| WO | WO 02/013021 A3 | 2/2002 | |

OTHER PUBLICATIONS

International Standard, Ref. No. ISO/IEC 7816-2: 1999(E), Information Technology—Identification Cards—Integrated Circuit(s) Cards With Contacts—Parts 2, 3 and 10, First Edition Mar. 1, 1999.

MultiMediaCard System Specification Version 2.11 Official Release, copyrighted Jun. 1999 MMCA, pp. 1-123.

"PCT Notification of Transmittal of The International Search Report or the Declaration", for International Application No. PCT/US01/24102, European Patent Office, Jun. 4, 2002, 8 pages.

SD Group, "SD Memory Card Simplified Specifications, Part 1, Physical Layer Specification", Version 0.96, Jan. 2000, 28 pages.

SanDisk MultiMedia Card Product Manual Rev 2, copyrighted 1999 SanDisk Corporation, pp. 1-86.

SanDisk MultiMedia Card Product Manual Rev 2, copyrighted 2000 SanDisk Corporation, pp. 1-86.

The Patent Office of the People's Republic of China, "Notification of Second Office Action," mailed in related Chinese Application No. 01814998.7 on May 12, 2006, 6 pages.

European Patent Office, Examiner's Report, mailed in related European Patent Application No. 01 959 385.4 (publication No. 1305717—WO 02/013021) on Aug. 29, 2006, 2 pages.

* cited by examiner

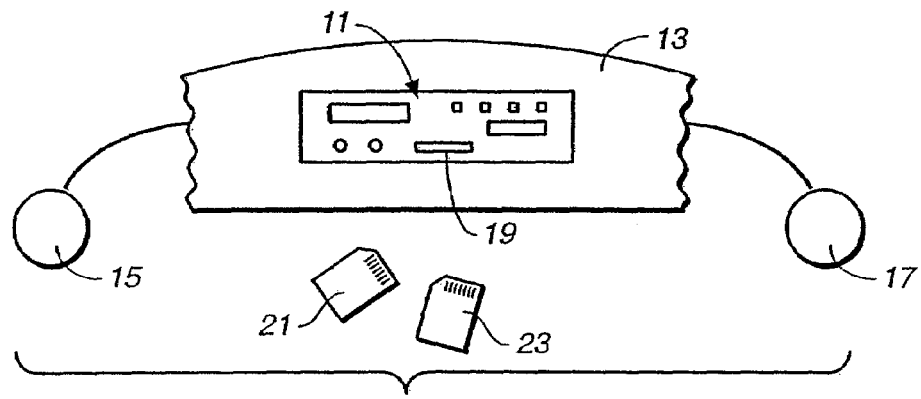
FIG._1
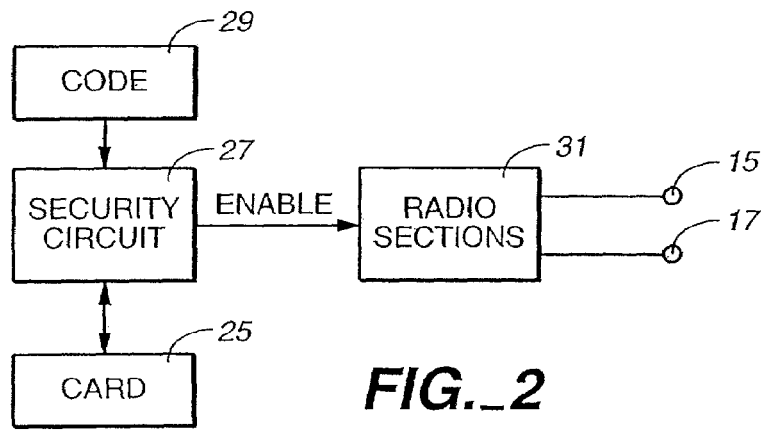
FIG._2
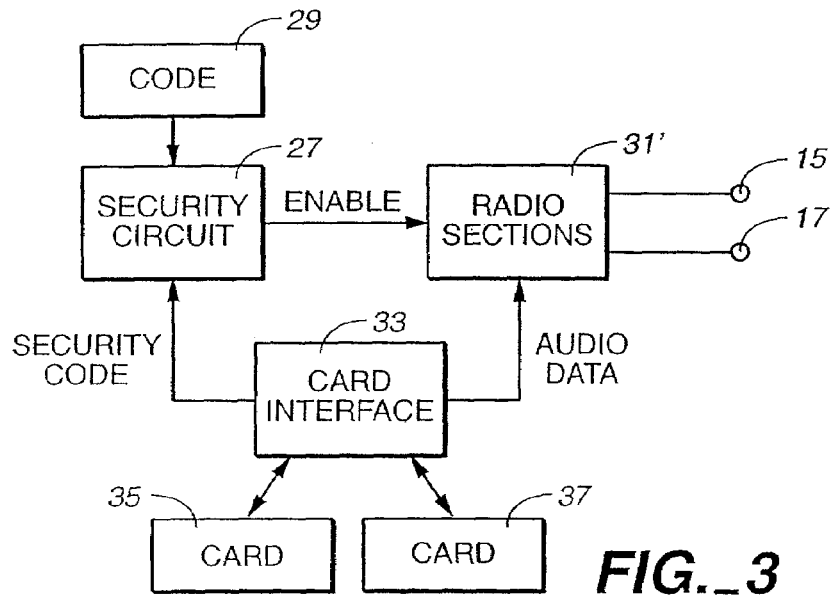
FIG._3

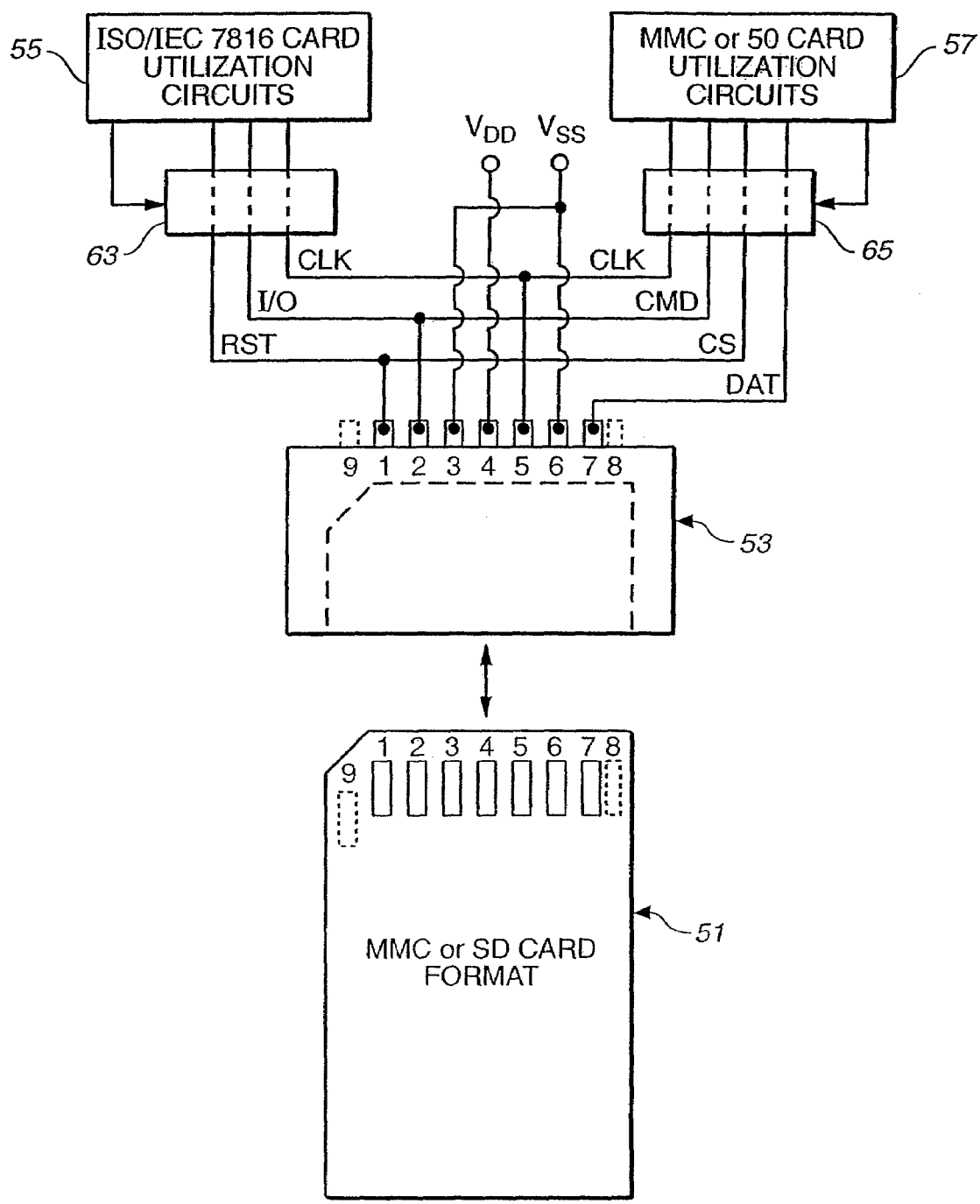
FIG._4

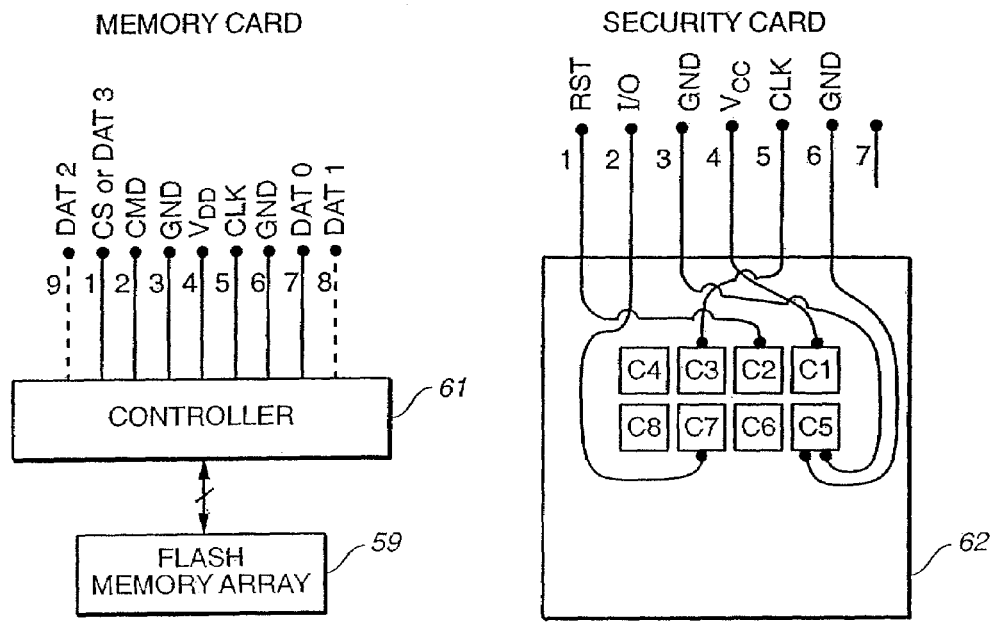
FIG._5    FIG._6
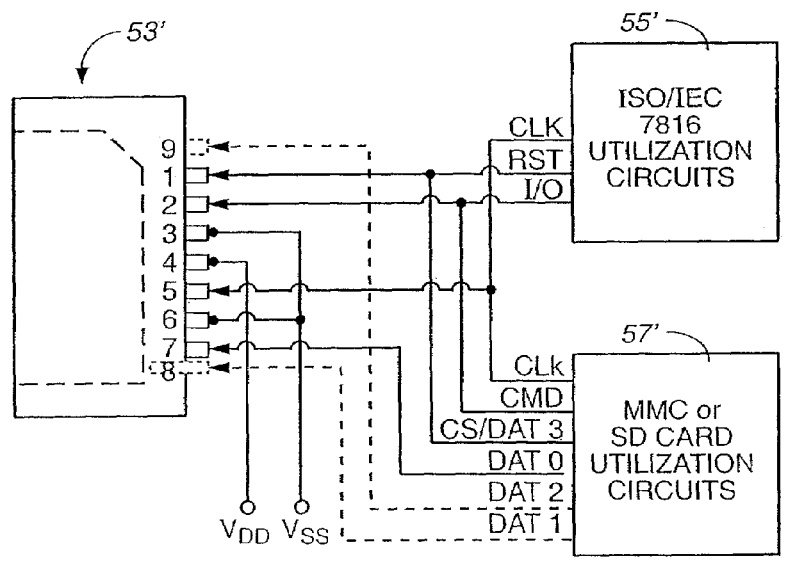
FIG._8

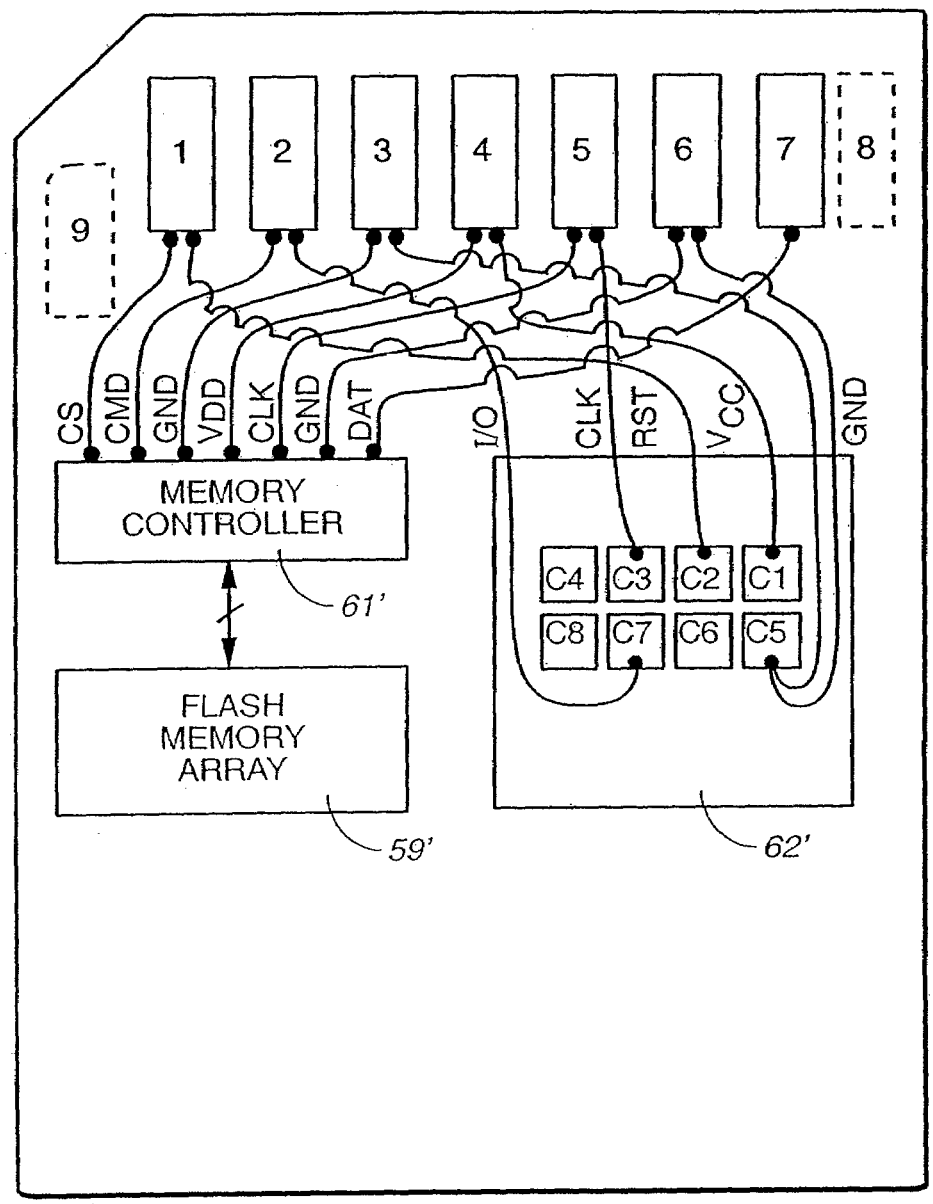
FIG._7

USE OF SMALL ELECTRONIC CIRCUIT CARDS WITH DIFFERENT INTERFACES IN AN ELECTRONIC SYSTEM

CROSS REFERENCE TO RELATED APPLICATIONS

This application is a continuation of application Ser. No. 10/886,309, filed on Jul. 6, 2004, which in turn is a continuation of application Ser. No. 09/633,089, filed on Aug. 4, 2000, now U.S. Pat. No. 6,824,063, issued on Nov. 30, 2004, which applications are incorporated herein in their entirety by this reference.

BACKGROUND OF THE INVENTION

This invention relates, generally, to the use and structure of removable electronic circuit cards having different mechanical and/or electrical interfaces, and, more specifically, to the use of non-volatile memory cards according to the related MultiMediaCard ("MMC") and Secure Digital ("SD") Memory Card interfaces and cards having an interface according to a standard of the International Organization for Standardization ("ISO") and the International Electrotechnical Commission ("IEC"), an example being the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation of Sunnyvale, Calif., assignee of the present application. These products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card.

Cards made according to the ISO/IEC 7816 standard are of a different shape, have surface contacts in different positions, and a different electrical interface than the MMC and SD Cards. The ISO/IEC 7816 standard has the general title of "Identification cards—Integrated Circuit(s) Cards with Contacts," and consists of parts 1-10 that carry individual dates from 1994 through 2000. This standard, copies of which are available from the ISO/IIEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner.

One general use of the small ISO/IEC 7816 cards is for security against the theft and/or unauthorized use of electronic systems, in which case the card stores a security code personal to the user or the electronic system. A radio installed in a vehicle is one type of electronic system, for example, where a security code personal to the radio needs to be input at times in order for the radio to operate. In one arrangement, circuitry within the radio is provided that renders it inoperable when battery power has be disconnected. Entry of a unique security code is then required to again allow the radio to operate. One way to deliver the security code is to store it on a small ISO/IEC 7816 card and provide a card slot in the radio into which the card is inserted. Circuits are included in the radio to read the code from the card, compare it with a unique code for the particular radio and, if the codes match, re-enable operation of the radio after the battery has been reconnected.

SUMMARY OF THE INVENTION

A single card receptacle of a host electronic system can interact with one or more removably insertable cards according to two or more different existing card standards that are incompatible with each other as to their physical card shapes, arrangements of external contacts and electrical signal interfaces. For example, some data, such as a unique security code, are readable by the system according to the ISO/IEC 7816 card standard that is best adapted to handle such data, and other data, such as user data or operating programs, are readable by the system according to either of the MMC or SD Card standards for which those standards have been designed. The present invention is not limited, however, to the use of any particular card standard or types of data stored according to existing card standards.

In one specific embodiment, the physical standards of one type of card are altered to conform to those of another type of card, and each type of card is then separately formed in a package that has the physical characteristics of the other type of card. For example, a card according to the ISO/IEC 7816 standard is physically altered to have the same shape and pin locations specified by either of the related MMC or SD Card standards, with the receptacle of the electronic system conforming to that card standard. The two or more cards are then accepted by a single receptacle of the electronic system.

In another specific embodiment, the functions according to two or more card standards are combined on a single card having the physical dimensions and electrical contact locations of one of those standards. For example, a card according to either of the related MMC or SD Card standards can be modified to include the circuitry of a card according to the ISO/IEC 7816 standard, with the two or more electrical functions of the different standards sharing a common set of card contacts.

There are many applications of these embodiments. For example, in a vehicle radio, a card receptacle is adapted to receive both a card containing a security code and a memory card containing data of music that may be reproduced through the vehicle's audio system when enabled by the correct security code. In another example, a portable electronic device, such as a hand held computer, personal organizer, cellular telephone, or the like, has a card slot that receives a card including a part of a utilization program that changes from time-to-time, or data for use with a utilization program, in addition to receiving a card containing a security code that enables the utilization program to operate in the device. In a further example, a GPS receiver card slot receives a card containing a user security code to enable operation of the receiver and a card containing data that are used in the operation of the receiver to locate position and the like. In each case, the utilization data and the security code may alternately be contained on the same card.

In these applications, when separate cards are being used, the security code may be stored on a low capacity, relatively inexpensive memory card which the device owner would normally maintain separate from the electronic device in a safe place. A different one or more memory cards of the same type but of larger storage capacity are then used to store the associated data. Circuits within the electronic device distinguish the security code from the associated data when reading a card placed in its slot and use the data accordingly.

Additional features and advantages of the present invention will become apparent from the following description, which should be taken in conjunction with the accompanying drawings.

BRIEF DESCRIPTION OF THE DRAWINGS

FIG. 1 illustrates a radio installed in a vehicle dashboard, as an example electronic device utilizing the present invention;

FIG. 2 is a schematic diagram of a security system used in the vehicle radio of FIG. 1 to render it inoperative when stolen;

FIG. 3 is a schematic diagram of an improved security system for the vehicle radio of FIG. 1 that also receives digital audio data for reproduction through the radio;

FIG. 4 is a schematic diagram of a card interface as part of a system that utilizes cards having different interface standards;

FIG. 5 illustrates the pin connections of the card of FIG. 4 when it is a flash memory card according to either of the MMC or SD Card interface standards;

FIG. 6 illustrates the pin connections of the card of FIG. 4 according to the ISO/IEC 7816 interface standard;

FIG. 7 is a block diagram of a single card containing both functions of the MMC or SD Card standards and the functions of the ISO/IEC 7816 standard; and FIG. 8 schematically illustrates use of the combined card of FIG. 7.

DESCRIPTION OF SPECIFIC EMBODIMENTS

In order to illustrate one specific application of the invention summarized above, details are given of the automobile radio example. FIG. 1 illustrates a radio 11 installed in a dashboard 13 of a motor vehicle such as a passenger automobile. An audio amplifier within the radio drives two or more loudspeakers 15 and 17 that are also installed in the vehicle. A tuner within the radio provides the amplifier with signals from radio stations. Audio tape and/or compact disk players can also be included in the radio as other sources of audio signals for the amplifier and loudspeakers.

The radio 11 has a usual assortment of controls and displays. Additionally, a slot 19 is included in the front of the radio to receive a standard non-volatile memory card. Two such cards 21 and 23 are shown. Electrical contacts are included within the slot 19 in the same pattern as contacts on such a memory card, so that an electrical connection between the radio and the contents of the memory card is established as soon as the card is fully inserted into the slot. When the card is removed from the slot, this connection is broken.

One type of memory card that is suitable for use as the cards 21 and 23 is the commercially available MCC. The more recent related SD Card may be used instead. Alternatively, a larger CompactFlash card may be used. Each of these card products includes a semiconductor flash EEPROM system, and is made by a number of manufacturers, including SanDisk Corporation of Sunnyvale, Calif., assignee of the present application. Other types of non-volatile memory cards may alternatively be employed. The mechanical and electrical interface that is provided in the slot 19 is made to conform to the requirements of the selected type of card.

Use of one such card 25 to store a security code is illustrated in FIG. 2. When the card 25 is inserted into the radio slot 19, contacts within the slot 19 make connection with electrical terminals on the card 25. A security circuit 27 within the radio 11 then receives the code data from the card and compares that code with an internally stored code that is unique to a particular radio. This internal code may be stored in a small amount of non-volatile memory, such as read-only-memory (ROM), provided as part of the radio circuitry. If the codes are found to be the same, the security circuit 27 then enables operation of the remaining portions 31 of the radio, including an audio amplifier that drives the loudspeakers 15 and 17, an a.m. and f.m. radio tuner, and a compact disk and/or tape player. Once the radio is enabled, the card 25 is removed from the slot 19.

Use of this card facility to input audio data, such as of music, in addition to the security code, is illustrated in FIG. 3. A card interface circuit 33 is added for direct electrical connection with a card that is inserted into the slot 19. The interface circuit 33 connects the terminals of the inserted card with both the security circuit 27 and the radio sections 31', each of which determines whether an inserted card contains data for it or not. The card 35 contains the unique security code that is used by the security circuit 27, and the card 37 contains audio data used by the radio sections 31', for example. When the card 35 is inserted into the slot 19, the security circuit 27 then operates as described above with respect to FIG. 2. If the card 37 is inserted into the slot 19, the radio sections 31' receives the stored data and plays its audio content through the loudspeakers 15 and 17. The radio sections 31' include circuits that convert the digital audio data from the card 37 into audio signals that are then amplified by an amplifier within the radio sections 31'.

The audio data stored on the memory card 37 is most commonly music, and, in order to store as much music as practical on a single card, is stored in a compressed form, such as by use of the common MP3 compression algorithm. When compressed, the card interface circuits 33 also include a signal processor for decompressing the digital audio data. More than one card slot maybe included in the radio 11 for accepting multiple memory cards that each contain music data files, in order to further increase the length of time that music maybe played without repetition or the replacement of a card.

The audio data card 37 is an alternative to the usual compact disk and tape players, which may also be included in the radio 11. Its use provides a convenient way to deliver music to the car radio 11. Digital music data may be stored on the card 37 by the user downloading the data from the Internet, for example, or transferred from a compact disc or other source. Multiple such cards may be used at one time, each containing data of different music. Each audio data card may be repetitively used by erasing its data and rewriting new data on it. The audio data card preferably has a capacity to store an amount of music that is typically delivered by a compact disk. About one hour's worth of music may be stored on a card that has a 64 megabyte capacity, for example, when the data is compressed to 10 percent of the amount of the original source data. The card 35 containing the security code, however, need have only a very small capacity, such as just one or a few kilobytes. The security code card can thus be quite inexpensive.

Various electronic devices in addition to a vehicle radio can also be provided with a memory card slot capable of such double duty. Something like the card interface circuit block 33 is also included in such other devices to interface both security code data and associated content data that is used by the electronic device to perform a function that is enabled by the security code. The security code is applied to a security circuit and the associated data is applied to a portion of the electronic device that carries out the function or operation that is enabled by receipt of the proper security code.

A description is given with respect to FIG. 4 in more detail of a system that interfaces for any of a number of reasons with cards that follow two different standards. Physically, a card 51 is illustrated to have the physical format of a MMC card, with surface electrical contacts 1-7. A SD Card, having the same dimensions in plan view, the same contacts 1-7 and additional surface contacts 8 and 9, could be substituted instead. In either case, a receptacle 53 includes mating contacts 1-7 for receiving only the MMC card, and, optionally, has additional contacts 8 and 9 in order to be able to operate with either the MMC or SD Card. Circuits 55 and 57 utilize unique electrical contents of different cards according to two different accepted card standards. One such card is a MMC or SD Card, without modification, as illustrated in FIG. 5. Another such card has the same physical shape and contact locations as either the MMC or SD Card but in nearly all other respects follows the ISO/IEC 7816 standard, as illustrated in FIG. 6. The utilization circuits 55 and 57 may be individually dedicated to operate with one of the card types, or, alternatively, can be implemented by a single micro-processor or micro-controller circuit.

The MMC and SD Cards, as shown in FIG. 5, include flash memory 59 and a memory controller 61. The electrical signals carried by the external card contacts to the controller 61 according to the MMC and SD Card standards are also shown, which are as follows:

| MMC/SD Contact No. | MMC Signal | SD Card Signal |
|---|---|---|
| 1 | Chip select (CS) when operating in an SPI mode | Data line (DAT3) |
| 2 | Command/Response (CMD) | Command/Response (CMD) |
| 3 | Low voltage supply (GND) | Low voltage supply (GND) |
| 4 | High voltage supply ($V_{DD}$) | High voltage supply ($V_{DD}$) |
| 5 | Clock (CLK) | Clock (CLK) |
| 6 | Low voltage supply (GND) | Low voltage supply (GND) |
| 7 | Data line (DAT) | Data line (DAT0) |
| 8 | — | Data line (DAT1) |
| 9 | — | Data line (DAT2) |

For the MMC card, data is serially transferred between a card and a host over a single line connected to contact no. 7 while four data lines are individually connectable to contacts nos. 1, 7, 8 & 9 of the SD card. The SD Card is also capable of operating over a single data line connected to its contact no. 7, however, in order to be compatible with systems designed for the MMC card and elsewhere where a high data transfer rate is unnecessary. A single line connected to contact no. 2 of each card carries operating commands from a host and returns responses (status) of the card to the host. A clock signal is provided by the host to contact no. 5 of each card but the clock rate may be different. The remaining contacts nos. 3, 4 & 6 receive operating voltages from the host.

A card according to the ISO/IEC 7816 standard, as shown in FIG. 6, has a different pattern of surface contacts, some of which perform different functions than the MMC or SD Cards. The ISO/IEC 7816 card is re-packaged according to the MMC or SD Card standard, including use of the MMC or SD Card pattern of external contacts that are connected to with the ISO/IEC 7816 standard contacts as follows:

| MMC/SD Contact No. | ISO/IEC 7816 Contact No. | ISO/IEC 7816 Signal |
|---|---|---|
| 1 | C2 | Reset (RST) |
| 2 | C7 | Input-Output (I/O) |
| 3 | C5 | Low voltage supply (GND) |
| 4 | C1 | High voltage supply ($V_{CC}$) |
| 5 | C3 | Clock (CLK) |
| 6 | C5 | Low voltage supply (GND) |
| 7 | — | — |
| 8 | — | — |
| 9 | — | — |

It will be noted that the high and low voltage supply contacts C1 and C5, and the clock signal contact C3 according to the ISO/IEC 7816 standard, are connected to the same external MMC or SD Card contacts nos. 3, 4, 5 & 6 in FIG. 6 as they are for the flash memory of FIG. 5. The ISO/IIEC 7816 standard is modified so that insertion of the card 51, when containing an ISO/EEC 7816 standard card of FIG. 6, into the receptacle 53 of FIG. 4 provides the proper voltage supplies and clock according to the ISO/IEC 7816 standard. In the arrangement illustrated, the card of FIG. 6 is read only, so no programming voltage is connected with the contact C6 of the ISO/IEC 7816 standard. Of course, the contacts C1-C8 of FIG. 6 need not actually be formed within the card 51 format but rather the signals identified by those contact numbers are connected directly from the operating circuits to the external contacts of the card 51.

The operable reset and input/output signal contacts C2 and C7 of the ISO/IEC 7816 standard, as shown in FIG. 6, are connected to the MMC or SD Card contacts 1 and 2, respectively. These card contacts, as well as the clock signal card contact 5, are connected through a switching logic circuit 63 of FIG. 4 to the utilization circuit 55. Similarly, the chip select, command/response, clock, and data contacts 1, 2, 5 and 7 of the FIG. 5 card are connected through switching logic 65 (FIG. 4) to the utilization circuit 57. Each of the utilization circuits 55 and 57 provides its own clock signal so that their cards of FIGS. 6 and 5, respectively, may operate at different clock frequencies. Of course, if the cards of FIGS. 5 and 6 can optimally operate with the same clock frequencies, then card contact 5 is connected with a common clock source rather than through the logic circuits 63 and 65. When either of the utilization circuits 55 or 57 recognizes that a card inserted into the receptacle is one with which the circuit is designed to operate, that circuit causes the appropriate one of the switching logic circuits 63 or 65 to connect it with the contacts of the receptacle 53. The power supply contacts 3, 4 and 6 of the receptacle 53 are connected to appropriate $V_{DD}$ and $V_{SS}$ (GND) sources.

When the circuit of FIG. 4 is used to provide security control of content utilization, one of many possible applications, the utilization circuits 55 read a security code from a card according to the ISO/EEC 7816 standard (FIG. 6) that is inserted into the receptacle 53. That read security code is then compared with one stored as part of the utilization circuits 55. If the comparison is positive, operation of the utilization circuits 57 is then enabled with data from a non-volatile memory card according to the MMC or SD Card standard (FIG. 5). Compressed digital audio is among many choices for the content of the MMC or SD Card that is utilized by the circuits 57. The embodiment described with respect to FIGS. 1-3 is an example of such a specific application of the circuits of FIGS. 4-5.

As an alternative to utilizing separate cards according to two different standards, the functions of the cards of FIGS. 5 and 6 maybe combined into a single physical structure according to the MMC or SD Card standard, as illustrated in FIG. 7. The non-volatile memory controller 61' and the circuit 62' according to the ISO/IEC 7816 standard are connected to the same ones of the external contacts 1-7 of the card of FIG. 7 as described above, the difference here being that they are both permanently connected to those contacts of a single card. This has the advantage that a user need not use two or more cards in order to have the capability of cards according to two or more different standards. A system such as that illustrated in FIG. 8 can access each part of a two standard card of FIG. 7 when inserted into the receptacle 53'. Circuits 55' utilize the part 62' that electrically and functionally meets the terms of the ISO/IEC 7816 standard, while circuits 57' utilize data stored in the non-volatile memory 59'. This may be applied, for example, to providing both a security code by the ISO/EEC 7816 standard and compressed audio data by the standard of the MMC or SD Card, to implement the techniques described above with respect to FIGS. 1-3 with a single card. The function of the utilization circuits 55' and 57' may alternately be carried out by a host computer, by a microcomputer that is dedicated to that purpose or by some other device that is suited to the particular application.

Although the present invention has been described with respect to a specific embodiment, it will be understood that the invention is entitled to protection within the full scope of the appended claims.

The invention claimed is:

1. An electronic card that is removably insertable into a receptacle which makes electrical contact with contacts on the electronic card, wherein a physical shape of the card and an arrangement of the contacts conform with a first published card standard, while an electrical interface through the contacts conforms to a second published card standard, the first and second card standards specifying incompatible physical card shapes, arrangements of contacts and electrical signal interfaces.

2. The card according to claim 1, wherein the first card standard is that of the MMC or SD Card, while the second card standard is an ISO/IEC 7816 standard.

3. The card according to claim 1, wherein the electronic card has an electrical signal interface through said contacts that conforms to only the second card standard.

4. The card according to claim 1, wherein data of a security code is stored in the card in a manner to be accessible through the card contacts according to the electrical interface of the second card standard.

5. The card according to claim 1, wherein the electronic card additionally includes an electrical signal interface through said contacts that conforms to the first card standard.

6. The card according to claim 5, wherein the electronic card includes data stored therein of a security code that is accessible through the card contacts according to the electrical interface of the second card standard, and additionally includes content data stored therein that is accessible through the card contacts according to the electrical interface of the first card standard, wherein the security code is adapted for use in enabling utilization of the content data.

* * * * *